(12) United States Patent
Robbin

(10) Patent No.: US 10,124,958 B2
(45) Date of Patent: Nov. 13, 2018

(54) CONVEYOR DEVICE FOR TRANSPORATION STRUCTURES

(71) Applicant: EISENMANN SE, Boeblingen (DE)

(72) Inventor: Joerg Robbin, Ammerbuch-Pfaeffingen (DE)

(73) Assignee: EISENMANN SE, Boeblingen (DE)

( * ) Notice: Subject to any disclaimer, the term of this patent is extended or adjusted under 35 U.S.C. 154(b) by 0 days.

(21) Appl. No.: 15/503,156

(22) PCT Filed: Aug. 1, 2015

(86) PCT No.: PCT/EP2015/001587
§ 371 (c)(1),
(2) Date: Feb. 10, 2017

(87) PCT Pub. No.: WO2016/026550
PCT Pub. Date: Feb. 25, 2016

(65) Prior Publication Data
US 2017/0233189 A1    Aug. 17, 2017

(30) Foreign Application Priority Data

Aug. 16, 2014 (DE) ........................ 10 2014 012 211

(51) Int. Cl.
| | | |
|---|---|---|
| *B65G 13/06* | (2006.01) | |
| *B65G 13/071* | (2006.01) | |
| *B65G 35/06* | (2006.01) | |
| *B65G 39/18* | (2006.01) | |

(52) U.S. Cl.
CPC ........... *B65G 13/071* (2013.01); *B65G 35/06* (2013.01); *B65G 39/18* (2013.01)

(58) Field of Classification Search
CPC ....... B65G 13/071; B65G 39/12; B65G 39/18
USPC ....... 198/463.1, 465.1, 465.2, 465.3, 781.02, 198/781.04, 803.2
See application file for complete search history.

(56) References Cited

U.S. PATENT DOCUMENTS

| | | | |
|---|---|---|---|
| 6,415,721 B1 * | 7/2002 | Morikiyo | .............. B61B 13/127 104/137 |
| 6,749,055 B2 * | 6/2004 | Takano | ................. B61B 13/127 104/168 |
| 6,752,359 B2 | 6/2004 | Nagenkoegl et al. | |
| 6,981,939 B2 | 1/2006 | Petratto | |

(Continued)

FOREIGN PATENT DOCUMENTS

| | | |
|---|---|---|
| DE | 39 42 594 A1 | 12/1991 |
| DE | 102 30 845 A1 | 2/2003 |

(Continued)

*Primary Examiner* — William R Harp
(74) *Attorney, Agent, or Firm* — Schroeder Intellectual Property Law Group, LLC

(57) ABSTRACT

A conveyor device for conveying transportation structures, particularly transportation skids in the automobile industry, having a conveyor path that is formed from a plurality of path units arranged one behind the other, each of the path units having two parallel longitudinal profiled sections. A drive system for said transportation structures is provided that has at least one drive device which, when said conveyor device is in operation, is arranged on at least one of said longitudinal profiled sections. The drive system includes at least one drive module which can be detachably secured to the longitudinal profiled section by means of a drive-securing device.

22 Claims, 7 Drawing Sheets

(56) References Cited

U.S. PATENT DOCUMENTS

| | | | |
|---|---|---|---|
| 7,127,997 B2 * | 10/2006 | Nishihara | B61B 13/127 |
| | | | 104/89 |
| 8,474,594 B2 * | 7/2013 | Robbin | B62D 65/18 |
| | | | 198/345.3 |
| 8,496,103 B2 | 7/2013 | Federmann et al. | |
| 2002/0108530 A1 | 8/2002 | Masugaki et al. | |
| 2003/0047655 A1 | 3/2003 | Nagenkogl et al. | |
| 2004/0162204 A1 | 8/2004 | Petratto | |
| 2005/0061194 A1 * | 3/2005 | Tada | B61B 13/127 |
| | | | 104/165 |
| 2012/0273326 A1 | 11/2012 | Federmann et al. | |

FOREIGN PATENT DOCUMENTS

| | | |
|---|---|---|
| DE | 10 2010 000 790 A1 | 7/2011 |
| EP | 1 424 191 A2 | 6/2004 |

* cited by examiner

CONVEYOR DEVICE FOR TRANSPORATION STRUCTURES

RELATED APPLICATIONS

This application is a national phase of International Patent Application No. PCT/EP2015/001587, filed Aug. 1, 2015, which claims the filing benefit of German Patent Application No. 10 2014 012 211.5, filed Aug. 16, 2014, the contents of both of which are incorporated herein by reference.

FIELD OF THE INVENTION

The invention relates to a conveyor device for conveying transportation structures, in particular transportation skids in the automotive industry, having a) a conveyor path that is formed from a plurality of sequentially disposed path units, each of said path units comprising two mutually parallel longitudinal profiled sections;

b) a drive system for the transportation structures, having at least one drive installation which is disposed on at least one of the longitudinal profiled sections during operation of the conveyor device.

BACKGROUND OF THE INVENTION

Conveyor devices of this type are employed in the form of roller-track conveyors for conveying transportation structures, for example. In the automotive industry, in particular vehicle bodies or parts thereof are transported by way of such conveyor devices between individual processing or treatment stations, such as painting stations or dryers, for example. For this purpose, the vehicle bodies or the parts thereof, respectively, are fastened to so-called transportation skids which are known per se. These transportation skids have two parallel skid runners which during transportation bear on rollers of the roller-track conveyor and which typically are disposed in pairs and, in the conveying direction, sequentially on the longitudinal profiled sections of the conveyor device. A drive unit in practice comprises a drivable roller which engages on a runner of the transportation skid. The drivable roller may be a bearing roller on which the transportation skid bears. Alternatively, the drive installation may also be configured as a friction-wheel drive and comprise a drive wheel that laterally engages on the runner of the transportation skid.

Known roller-track conveyors are assembled from individual, pre-fitted path units in which the rollers and in particular the drive installation are fixedly installed. In this case, the spacings between two drive installations are adapted such that one transportation skid always interacts with at least one drive installation such that continuous driving of the transportation structures is ensured.

The transportation structures, specifically the transportation skids, are typically adapted to the items to be conveyed, and under certain circumstances also have a length which is adapted to the items. If and when the items to be conveyed by the conveyor device then change, it may arise that available transportation skids are longer than required, and also that a plurality of items may no longer be conveyed on one transportation skid.

Nevertheless, shorter transportation skids cannot be employed in such a case, since the spacings between two drive installations then become so large that the transportation skids between two drive installations are left without contact with a drive installation, with driving then being interrupted.

Moreover, the pre-fitted path units having the fixedly installed drive installations are comparatively bulky during fitting, and require a large space already during transportation.

SUMMARY OF THE INVENTION

It is therefore an object of the invention to provide a conveyor device of the type mentioned at the outset, which takes account of these concepts.

This object may be achieved in the case of a conveyor device of the type mentioned at the outset in that c) the drive system comprises at least one drive module which is releasably fastenable to the longitudinal profiled section by means of a drive fastening installation.

According to the invention, the drive installation is not fixedly installed on the path unit, but may also be fitted during active operation, or in the case of an installed conveyor device be refitted or retrofitted in order to extend the existing conveyor device, respectively. Moreover, the conveyor device may be transported in a more space-saving manner, since the drive installations in particular typically protrude significantly from the longitudinal profiled sections of the conveyor device, rendering the system bulky.

It is particularly favorable for the drive module to comprise a drive unit which has a motor and a drive wheel, drivable by said motor, and which is releasably attachable and fixable to the drive fastening installation. The flexibility of the system is increased in this way, on the one hand. Since the drive unit in practice determines the weight of the drive module, fitting of the drive module is facilitated, on the other hand. In this case, only the drive fastening installation without the drive unit may initially be fastened to the longitudinal profiled section, the drive unit being subsequently attached to the drive fastening installation.

A modular construction of this type may be particularly readily implemented when the drive installation operates as a friction-wheel drive and comprises a counter roller which interacts with the drive wheel.

Simple fitting is supported when the drive fastening installation comprises a clamping jaw and a counter clamping jaw, which in the fitted state bear on mutually opposite external faces of the longitudinal profiled section and are clampable in relation to these external faces. In the case of this configuration, the components are readily accessible to a technician.

An advantageous fastening system is provided when the clamping jaw and the counter clamping jaw are connectable by means of connection bolts that are supported by the clamping jaw and are disposed such that at least one connection bolt extends transversely across an upper side, and at least one connection bolt extends transversely across a lower side of the longitudinal profiled section, if and when the drive fastening installation is attached to the longitudinal profiled section.

In this instance, the counter clamping jaw preferably has passage openings which are complementary to the connection bolts and which are capable of being penetrated by the connection bolts that for fixing the drive fastening installation by means of securing means are fastenable to the counter clamping jaw. The securing means are preferably locknuts, for example, which may be screwed onto threaded ends of the connection bolts.

It is moreover advantageous for one jaw of the drive fastening installation to be a drive clamping jaw and to be a first part of a pivoting hinge which comprises an additional pivoting jaw as a second part which is pressed toward the first part of the pivoting hinge by means of a pre-tensioning unit. If and when the drive unit is supported by this pivoting jaw it is ensured that the drive unit, or the drive wheel thereof, respectively, is always pressed in the direction of the transportation structure, on account of which a reliable drive contact is guaranteed.

It is particularly favorable here for the additional pivoting jaw to have one or a plurality of receptacles for one or a plurality of retaining units on the drive unit.

For simple fitting or dismantling of the drive unit it is particularly advantageous when at least one retaining unit is configured as a mushroom pin, and one receptacle that is conceived for this retaining unit is configured as a slot-type receptacle or a key-hole receptacle.

The above-mentioned concepts in terms of reduced space requirement and flexible installation of the conveyor device are moreover taken into account when the path unit comprises a) a plurality of guide consoles which are releasably fastenable to a longitudinal profiled section and which each mount one bearing roller for the transportation structure, and at least one guide roller for the lateral guidance of the transportation structure;

and/or b) a plurality of bearing consoles which are releasably fastenable to a longitudinal profiled section and which each mount one bearing roller for the transportation structure.

In this case, the essential conveyor components of the conveyor device are conceived as individual conveyor modules which in terms of the fitting location and of numbers may be fitted to the longitudinal profiled sections in a flexible manner.

The desire for simple fitting is satisfied in particular here when a) a guide console comprises two clamping jaws, of which in each case one clamping jaw mounts one guide roller, and the bearing roller is mounted between the clamping jaws, wherein the clamping jaws therebetween may receive the longitudinal profiled section and are interconnectable by way of connection elements such that the guide console is clampable to the longitudinal profiled section;

and/or b) a bearing console comprises two clamping jaws which therebetween mount a bearing roller, wherein the clamping jaws therebetween may receive the longitudinal profiled section and are interconnectable by way of connection elements such that the bearing console is clampable to the longitudinal profiled section.

Ready accessibility of the fastening components for a technician is also achieved on account of the above.

It is particularly favorable for a quick-release fastener to be configured for at least one available connection element.

The modular concept is advantageously followed when support frames which are releasably connectable to the longitudinal profiled sections are available. In this case, the longitudinal profiled sections too are available as individual components.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

An exemplary embodiment of the invention will be explained in more detail hereunder by means of the drawings, in which.

DETAILED DESCRIPTION OF THE PRESENT INVENTION

Figure 1:
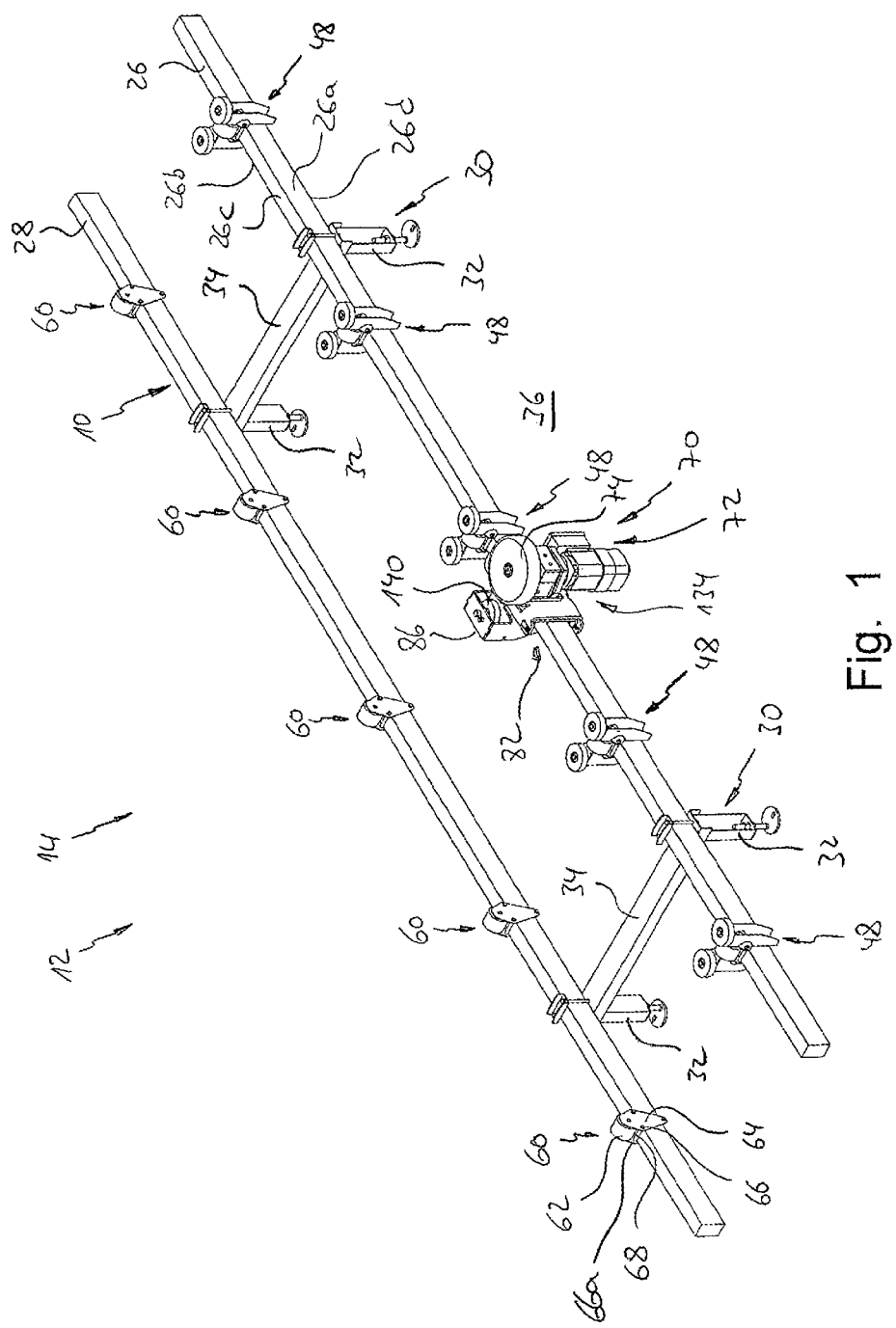
FIG. 1 shows a perspective view of a path unit of modular construction of a roller-track conveyor which overall is constructed from a plurality of such path units.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

Figure 2:
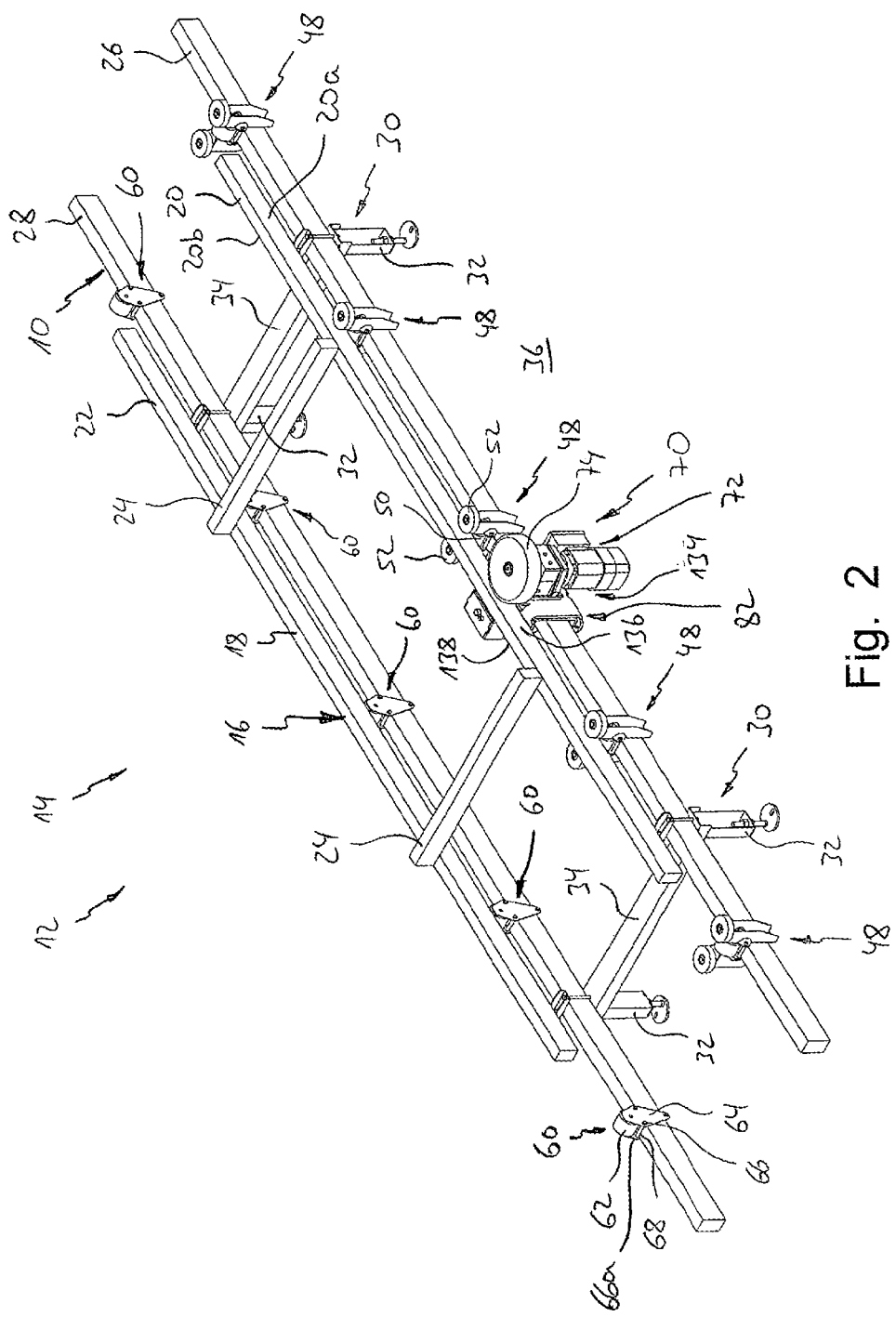
FIG. 2 shows a view, corresponding to that of FIG. 1, of the path unit of the roller-track conveyor of FIG. 1, having a transportation structure in the form of a transportation skid running thereon.

Reference is initially made to FIGS. 1 and 2 which each show a path unit 10 of modular construction of a conveyor device 12 which is conceived as a roller-track conveyor 14. The conveyor device 12 and consequently the roller-track conveyor 14 are constructed from a plurality of such path units 10. The conveyor device 12 thus defines a conveyor path which is formed from a plurality of sequentially disposed path units 10.

A transportation structure 16 for items to be conveyed is additionally shown running on the roller-track conveyor 14 in FIG. 2. Said transportation structure 16 in the present exemplary embodiment is a transportation skid 18 such as is used in the automotive industry and onto which, in a manner known per se, one or a plurality of items to be conveyed may be fastened; said items include vehicle bodies, in particular, or parts thereof, or add-on parts. In the case of a vehicle body, one transportation skid 18 typically receives one vehicle body, whereas smaller items such as, for example, add-on parts, are again received in dedicated transportation frames which in turn are fastened onto the transportation skid 18. As can be seen in FIG. 2, the transportation structure 16 comprises two parallel runners 20, 22 which are interconnected by crossbeams 24.

The roller-track conveyor 14 is conceived in particular for the connection in terms of material flow of processing or treatment stations in which the items are moved by way of dedicated conveying technologies that are adapted to the environmental conditions prevailing in the processing or treatment stations.

One path unit 10 of the roller-track conveyor 14 comprises two longitudinal square-profiled sections 26, 28 which are disposed so as to be mutually parallel on support frames 30 and are fastened to the latter, thus defining the transportation direction of the transportation skids 18. In the case of the present exemplary embodiment, two support frames 30 per path unit 10 are provided; however, more than two support frames 30 may also be employed for one path unit 10.

If and when directional indications such as lateral, top, bottom, vertical, horizontal, or the like are used hereunder, said directional indications at all times refer to the components in the case of the constructed roller-track conveyor 14.

Figure 5:
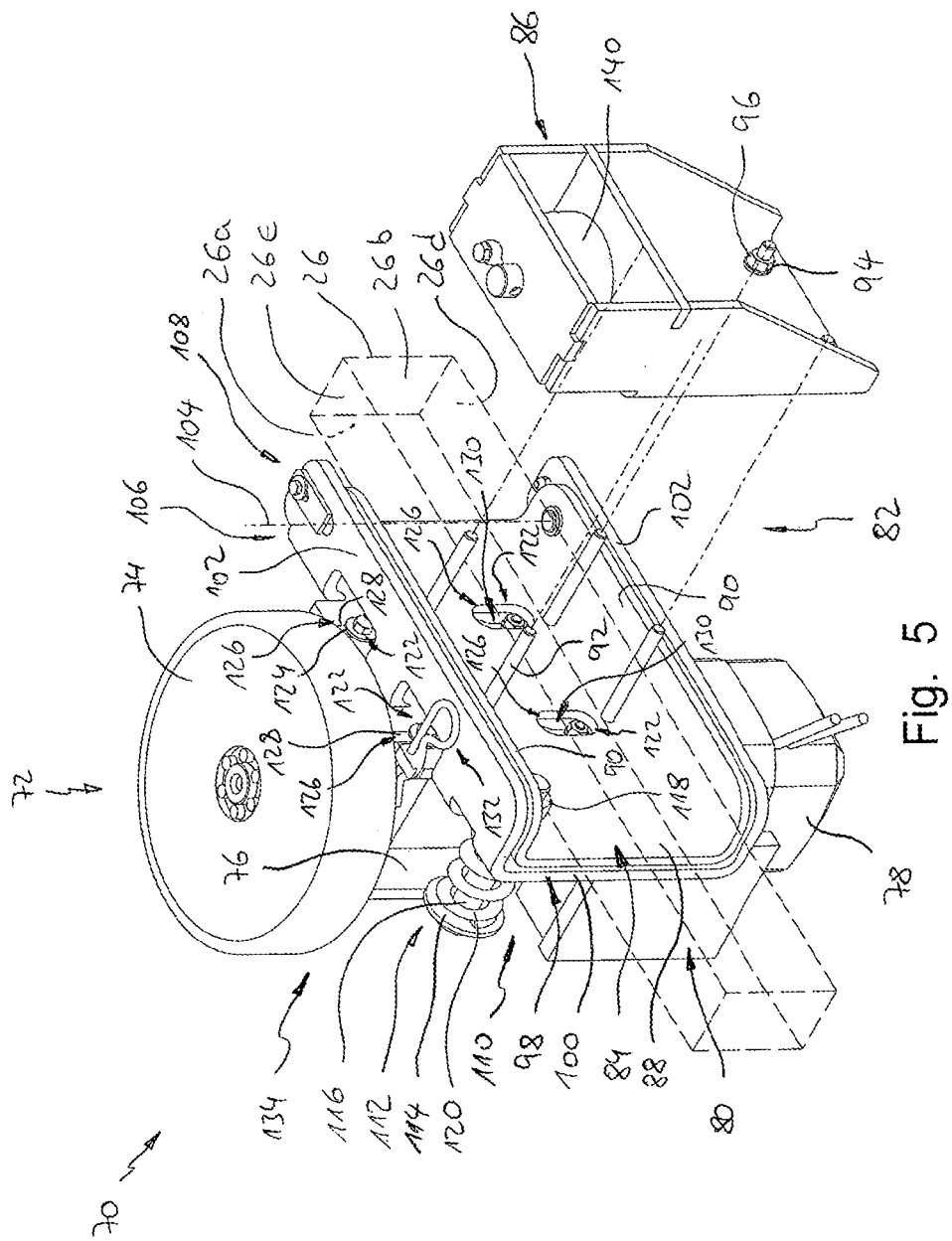
FIG. 5 shows a drive module of the roller-track conveyor.

In the case of the longitudinal profiled section 26, the mutually opposite lateral flanks are identified by 26*a* and 26*b*, the upper side, that is the conveying side, by 26*c*, and the lower side by 26*d*, this being shown only in FIGS. 1 and 5.

The support frames 30 each comprises two support feet 32 which are fastened to mutually opposite ends of a connecting profiled section 34 and by way of which the support frames 30 may be anchored to the floor 36 of the operating site of the roller-track conveyor 14.

Figure 3:
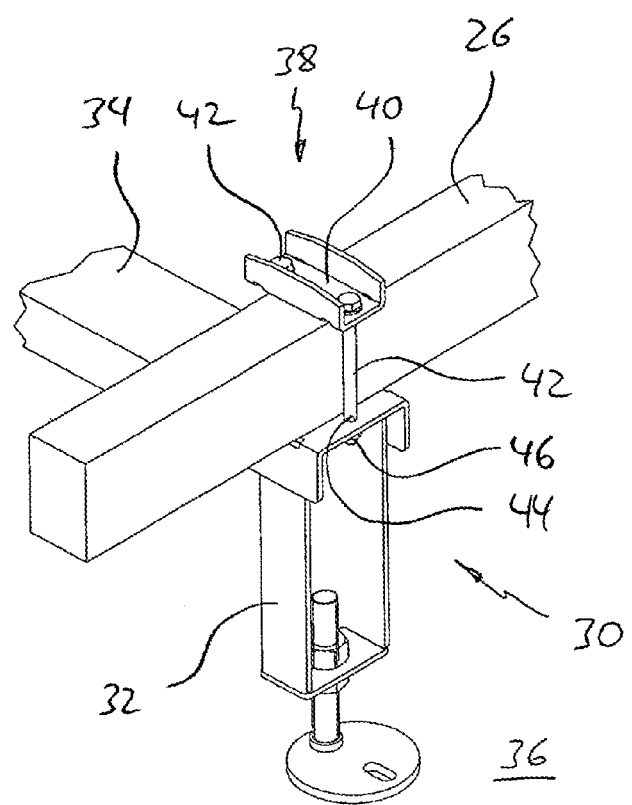
FIG. 3 shows a fragment of a support frame of the roller-track conveyor.

The longitudinal profiled sections 26, 28 of the roller-track conveyor 14 are each releasably connected to the support frame 30. To this end, the support frames 30 comprise support-frame fastening installations 38 by way of which the longitudinal profiled sections 26, 28 may be releasably fastened to mutually opposite end regions of the connecting profiled section 34. The support-frame fastening installations 38 and the components thereof are provided with a reference sign only in FIG. 3.

As can be seen more clearly therein, a support-frame fastening installation 38 has a clamping plate 40 which bears on the upper side of the longitudinal profiled section 26, 28 to be fastened, and two clamping screws 42, emanating from said clamping plate 40. In the fitted state, the clamping screws 42 flank the respective longitudinal profiled section 26, 28 on either side and penetrate the connecting profiled section 34 of the support frame 30, on which connecting profiled section 34 the longitudinal profiled section 26, 28 now bears. The connecting profiled section 34 for this purpose has passage bores 44 that are disposed and dimensioned so as to be complementary to the former, such that the clamping screws 42 may be provided with locknuts 46 on that side of the connecting profiled section 34 that then faces away from the longitudinal profiled section 26, 28. The clamping plate 40, by correspondingly rotating the locknuts 40, is then moved in the direction of the connecting profiled section 34, on account of which the longitudinal profiled section 26, 28, lying therebetween, is clamped by way of four clamping points.

Figure 4:
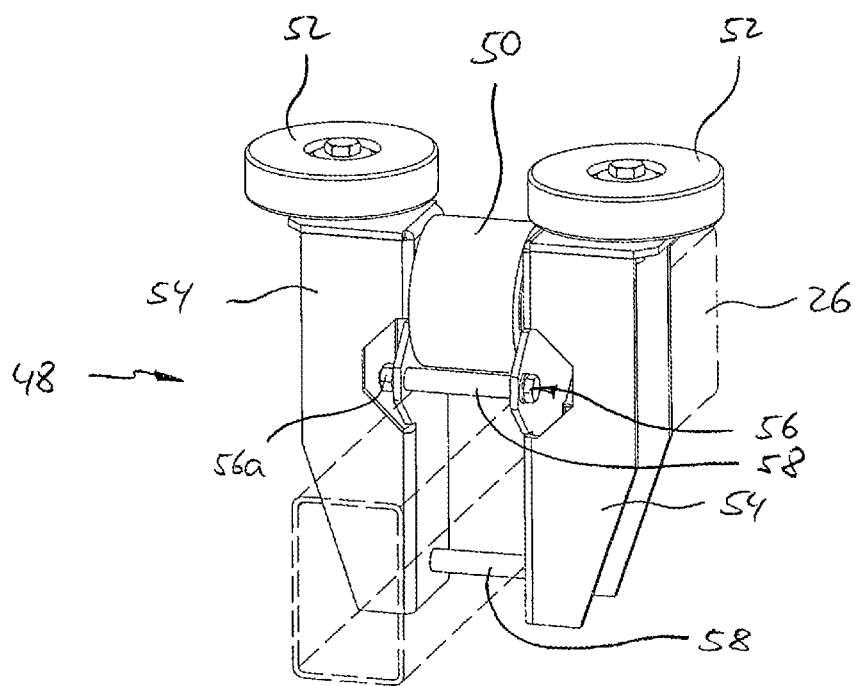
FIG. 4 shows a guide console of the roller-track conveyor.

The conveyor device 12 comprises guide consoles 48, of which a plurality, spaced apart in a uniform manner, are releasably fastened to one of the longitudinal profiled sections 26, 28; in the present exemplary embodiment, the latter is the longitudinal profiled section 26. As is shown in FIG. 4, one guide console 48 comprises one bearing roller 50 on which the runner 20 of the transportation structure 16 can run. Moreover, one guide console comprises two guide rollers 52 for the lateral guidance of the transportation structure 16, one of said guide rollers 52 pressing against the external lateral flank 20*a*, pointing outward, and the other pressing against the internal lateral flank 20*b*, pointing to the interior of the skid, of the runner of the transportation skid 18, if and when the latter is located in the region of the guide console 48 and runs on the bearing roller 50, as can be seen in FIG. 2. Therein, the bearing roller 50 and the guide rollers 52 are provided with reference signs in the case of only one guide console 48. During operation, the rotation axis of the bearing roller 50 thus runs horizontally and transversely with respect to the longitudinal beams 26, 28, and the rotation axes of the guide rollers 52 run vertically.

The guide console 48 comprises two clamping jaws 54 as fastening installation, of which in each case one clamping jaw 54 mounts one guide roller 52, and the bearing roller 50 is mounted between said two clamping jaws 54. In the fitted state, the clamping jaws 54 therebetween receive the longitudinal profiled section 26 and are interconnected by way of connection elements in the form of connection screws 56 having locknuts 56*a* such that the guide console 48 is clamped to the longitudinal profiled section 26. The connection screws 56 are push-fitted through spacer sleeves 58, the length of the latter corresponding to the width of the longitudinal profiled sections 26, 28. In FIG. 4, only one of three connection screws 56, and two of three spacer sleeves 58, can be seen.

For the construction of the path unit 10, or of the roller-track conveyor 14, respectively, a respective guide console 48 may be pre-fitted, with the clamping screws 56 being loosened. This pre-fitted guide console 48 is then push-fitted into the desired position on the longitudinal profiled section 26. All clamping screws 56 are then tightened such that the two clamping jaws 54 are converged and are thus releasably fastened to the longitudinal profiled section 26.

In the case of the present exemplary embodiment, a lower connection screw 56, having a spacer sleeve 58, is disposed on the lower side of the longitudinal profiled section 26, whereas two upper connection screws 56, each having one spacer sleeve 58, interconnect the two clamping jaws 54 on the upper side of the longitudinal profiled section 26.

The mounting height of the bearing roller 50 on the clamping jaws 54, and the positions of the upper connection screws 56 and spacer sleeves 58, are adapted here such that the bearing roller 50 may rotate freely if and when the upper spacer sleeves 58 bear on the upper side of the longitudinal profiled section 26. In this way it is ensured that the bearing roller 50 can never come into contact with the longitudinal profiled section 26.

The spacings between two adjacent guide consoles 48 are adapted to the length of the transportation skid 18 such that the runner of the latter is always guided by at least three guide consoles 48; this is illustrated in FIG. 2.

The conveyor device 12 moreover comprises bearing consoles 60 of which a plurality, spaced apart in a uniform manner, are releasably fastened to one of the longitudinal profiled sections 26, 28; the latter in the present exemplary embodiment is the longitudinal profiled section 28. The bearing consoles 60 are not specifically shown in detail. In the case of said bearing consoles 60, in each case one bearing roller 62 is mounted between two clamping jaws 64 that are available as fastening installation. In the fitted state, the clamping jaws 64 therebetween receive the longitudinal profiled section 26 and are interconnected by way of connection elements, here in the form of three connection screws 66 having locknuts 66*a*, such that the bearing console 60 is clamped to the longitudinal profiled section 26. The components 62 to 66 and 66*a* in FIGS. 1 and 2 have a reference sign only in the case of one bearing console 60.

The basic construction of the bearing console 60 corresponds to that of the guide console 48 explained above, and the narrative thereto applies in an analogous manner, wherein the clamping jaws 64 of the bearing console 60 do not extend beyond the bearing face of the bearing roller 62 for the transportation skid 18. In this way, the runner 22 of the transportation skid 18 that rolls on the bearing rollers 62 of the bearing consoles may move laterally without disturbing the movement of the transportation skid 18.

By virtue of construction-related tolerances, the spacings of the runners 20, 22 of different transportation skids 18 may be dissimilar. Since the one runner 20 is at all times guided in the guide consoles 48 such that any lateral movement is prevented, these tolerances may be compensated for on the side of the bearing consoles 60, since the second runner 22 may run off laterally there without any hindrance.

The spacings between two adjacent bearing consoles 60 are adapted to the length of the transportation skid 18 such that the runner 22 of the latter always bears on at least three bearing consoles 60; this is illustrated again in FIG. 2.

Moreover, the conveyor device 12 overall comprises a drive system, not provided with a dedicated reference sign, for the transportation structures 16, having at least one drive installation which during operation of the conveyor device 12 is disposed on one of the longitudinal profiled sections 26, 28. This drive installation operates in the present exemplary embodiment as a friction-wheel drive. Said drive installation is configured as a drive module 70 which may be releasably fastened to a longitudinal profiled section 26, 28. In practice, the drive module 70 is attached to the same longitudinal profiled section 26, 28 which also supports the guide console 48; in the case of the present exemplary embodiment, this is the longitudinal profiled section 26 of the roller-track conveyor 14.

The conveyor device 12 comprises a plurality of drive installations in the form of such drive modules 70, wherein the spacing between two adjacent drive modules 70 is adapted such that one conveyor structure 16 is always driven by at least one drive module 70.

FIG. 5 shows a drive module 70 to a larger scale and from a viewing direction that lies approximately opposite that of FIGS. 1 and 2. As can be seen in FIG. 5, a drive module 70 comprises a drive unit 72 having a drive wheel 74 which is mounted on a motor 78 by way of a transmission block 76. The motor 78 is an electric motor and is supplied with power and control signals, in a manner that is known per se, by way of a supply unit 80, shown only schematically in FIG. 5.

The drive module 70 comprises a drive fastening installation 82 which may be releasably fastened to the longitudinal profiled section 26. To this end, the drive fastening installation 82 comprises a clamping jaw 84, which hereunder will be referred to as a drive-clamping jaw, and a counter clamping jaw 86, which in the fitted state bear on mutually opposite external faces of the longitudinal profiled section 26. In the case of the present exemplary embodiment, these external faces are the vertical lateral flanks 26a, 26b of the longitudinal profiled section 26.

In the case of a modification that is not specifically shown, the drive-clamping jaw 84 and the counter clamping jaw 86 may also bear on the upper side, or the lower side, respectively, of the longitudinal profiled section 26. Components, which will be explained hereunder, optionally then have to be fastened to the drive-clamping jaw 84 and/or to the counter clamping jaw 86 by way of support angles, offset by 90°.

The drive-clamping jaw 82 has a C-shaped cross section which is formed by one bearing plate 88 and two press-edged mounting portions 90 which protrude at a 90° angle from mutually opposite sides of the bearing plate 88. If and when the drive-clamping jaw 82 is fitted, the mounting portions 90 protrude horizontally above and below somewhat beyond the upper side and the lower side of the longitudinal profiled section 26, respectively.

Four connection bolts 92 protrude perpendicularly from the bearing plate 88, the former being disposed such that in each case two upper connection bolts 92 extend transversely across the upper side 26c, and in each case two lower connection bolts extend transversely across the lower side 26d of the longitudinal profiled section 26, if and when the drive fastening installation 82 is attached to the longitudinal profiled section 26.

When attaching the drive fastening installation 82, the drive-clamping jaw 82 is initially brought up to the lateral flank 26a of the longitudinal profiled section 26, wherein, in a corresponding manner, two connection bolts 92 are guided over the longitudinal profiled section 26 and two connection bolts 92 are guided under the longitudinal profiled section 26. Once the bearing plate 88 then bears on the lateral flank 26a of the longitudinal profiled section 26, the connection bolts 92 project beyond the opposite lateral flank 26a where the counter clamping jaw 86 is located.

The latter has four through bores 94, of which only one can be seen in FIG. 5, the positions and diameters of said through bores 94 being complementary to the connection bolts 92. In this way, the counter clamping jaw 86 may be moved close to the lateral flank 26a of the longitudinal profiled section 26 such that the connection bolts 92 are guided through the through bores 94. In order for the drive fastening installation 82 to be fixed, the connection bolts 92, on that side of the counter clamping jaw 86 that now faces away from the longitudinal profiled section 26, are fastened to the counter clamping jaw 86 by way of securing means in the form of locknuts 96, to which end the free ends of the connection bolts 92 have an external thread that is not provided with a dedicated reference sign. Again, only one of the locknuts 96 can be seen in FIG. 5. Said locknuts 96 are then tightened such that the drive-clamping jaw and the counter clamping jaw 86 are converged and drawn in the direction toward the longitudinal profiled section 26, to which said jaws are ultimately fastened in a releasable manner.

The drive fastening installation 82 moreover comprises a pivoting jaw 98, likewise C-shaped in cross section, which is mounted in an articulated manner on the drive-clamping jaw 84 and is dimensioned such that it may be push-fitted over the drive-clamping jaw 84, so to speak, as can be seen from FIG. 5. The pivoting jaw 98 comprises a retaining plate 100 for the drive unit 72, and two press-edged articulation portions 102.

The pivoting jaw 98 is pivotable about a pivoting axis 104 in relation to the drive-clamping jaw 84, to which end the mounting portions 90 of the drive-clamping jaw 84 and the articulation portions 102 of the pivoting jaw 98 are connected to form a pivoting hinge 106 having an articulation region 108. Thus, the drive-clamping jaw 84 forms a first part, and the pivoting jaw 98 forms a second part, of the pivoting hinge 106.

The pivoting jaw 98, at that end 110 of the pivoting hinge 106 that faces away from the articulation region 108, is pressed under pre-tensioning in the direction toward the drive-clamping jaw 84 with the aid of a pre-tensioning unit 112. The pre-tensioning unit 112 comprises a counter plate 114 at one end of a spacer bolt 116, the other end thereof carrying an external thread and being guided through through bores (not provided with a dedicated reference sign) of the pivoting jaw 98 and of the drive-clamping jaw 84, where a set nut 118 is screwed onto the thread. A spring 120 is disposed between the counter plate 114 and the pivoting jaw 98. In this way, the pivoting jaw 98 is pressed at all times in the direction toward the drive-clamping jaw 84. The spacing between the counter plate 114 and the pivoting jaw 98 may be modified by rotating the set nut 118, on account of which the effective force of the spring 120 acting on the clamping jaw 98 may also be set. In practice, the pre-tensioning force brought about by the spring 120 is approximately 2000 N.

The pre-tensioning unit 112 is disposed in a region between the upper connection bolts 92 and the upper mounting portion 90 of the drive-clamping jaw 84. To this end, the drive-clamping jaw 84 and the pivoting jaw 98 are configured such that in the fitted state an adequate intermediate space in which the set nut is disposed without making contact with the longitudinal profiled section 26 remains between the upper mounting portion 90 of the drive-clamping jaw 84 and the upper side 26c of the longitudinal profiled section 26.

The drive unit 72 may be releasably attached and fixed to the drive fastening installation 82. The drive unit 72 may be hooked into the pivoting jaw 98 of the drive fastening installation 82, to which end the drive unit 72 has one or a plurality of retaining units 122, wherein in the case of the present exemplary embodiment four mushroom pins 124 are available, only one of which is provided with a reference sign. In a simple case, such a mushroom pin 124 may be implemented by way of a screw with a washer, as is visualized in FIG. 5.

The pivoting jaw 98 now has one or a plurality of receptacles 126 that are complementary to the retaining units 124. In the case of the present exemplary embodiment, two upper receptacles 126 are configured as slot-type receptacles 128, open at the top, on the periphery of the retaining plate 100, and two lower receptacles 126 are configured as two key-hole receptacles 130 in the center of the retaining plate 100 of the pivoting jaw 98.

Movement of the drive unit 72 out of the receptacles 126 of the pivoting jaw 98 is prevented by a spring protection means 132 which engages in corresponding mating components both on the pivoting jaw 98 and on the drive unit 72. Said spring protection means 132 is attached after the drive unit 72 has been hooked into the pivoting jaw 98.

The drive unit 72 is configured as a rapid-changeover unit 134 in conjunction with the receptacles 126 on the pivoting jaw 98 and may be attached and fixed to the drive fastening installation 82 or separated from the latter without the assistance of tools.

In the case of the present exemplary embodiment, the drive fastening installation 82 is a component of the drive module 70 and is comprised therein. In the case of a modification that is not specifically shown, the drive fastening installation 82 may also be fixedly and non-releasably positioned on the longitudinal profiled section 26, and welded to the longitudinal profiled section 26, for example. In this case, the drive unit forms a drive installation in the form of a drive module which is releasably fastenable to the longitudinal profiled section 26 by means of a drive fastening installation. The drive fastening installation 82 in this instance is to be understood to be a separate constructive unit which is not comprised by the releasable drive module.

In the case of a fitted drive unit 72, the drive wheel 74 presses against a drive face 136 of the runner 20 of the transportation structure 16 by virtue of the pre-tensioning unit 112 if and when said drive face 136 is located in the region of the drive module 70. As can be seen in FIG. 2, the drive face 136 of the runner 20 is formed by the external lateral flank 20a thereof.

The internal lateral flank 20b of the runner 20, which lies opposite the drive face 136, serves as a guide face 138 (cf. FIG. 2), by way of which the conveyor structure 16 runs on a counter roller 140 which, in a corresponding position, is mounted by the counter clamping jaw 86 so as to be freely rotatable about a horizontal rotation axis, and which can be readily seen in FIG. 5.

Overall, the longitudinal profiled sections 26, 28 and the support frames 30 form separate construction modules for a main frame 26, 28, 30, constructed therefrom, of the conveyor device 12, and the guide consoles 48, the bearing consoles 60, and the drive module 70 having the drive fastening installation 82 and the rapid-changeover unit 134 form separate conveyor modules which may be fastened on the main frame 26, 28, 30 of the conveyor device 12, so as to be releasable and modifiable in terms of the position thereof.

In this way, it may arise during active operation of the conveyor device 12, that transportation structures 16 that are shorter in the conveying direction are to be used. In this case, optionally further drive modules 70 have to be fitted to a path unit 10.

In the on-site planning and concept stage of the conveyor device it may already be provided that a plurality of drive fastening installations 82 are fastened to longitudinal profiled sections 26 of the available path units 10, without all of the drive fastening installations 82 then available being equipped with a drive unit 72. Drive units 70 in the form of the rapid-changeover units 134 may be retrofitted in a rapid and complication-free manner by hand only if shorter transportation structures 16 are to be used.

However, adding or repositioning drive modules 70 and/or the other mentioned conveyor modules in the form of the guide consoles 48, of the bearing consoles 60, and of the drive modules 70 having the drive fastening installation 82 and the rapid-changeover unit 134 is also readily possible.

Figure 6:
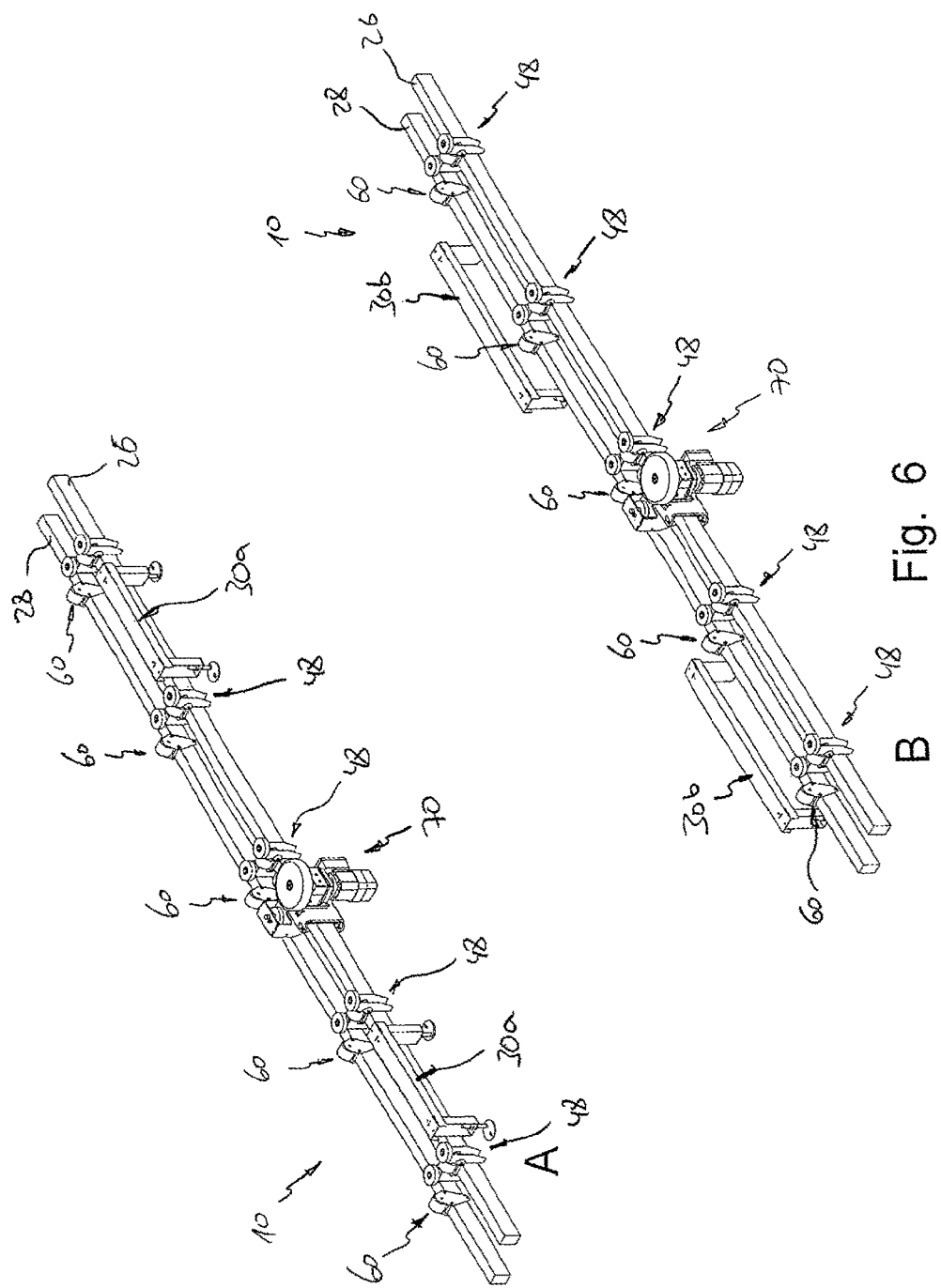
FIGS. 6A and 6B show two path units of roller-track conveyors, disassembled into construction and conveyor modules, having in each case dissimilar track gauges.

The conveyor device 12, by virtue of the modular construction, may be stored and transported in a space-saving manner prior to or after fitting. This is illustrated in FIG. 6, in which two disassembled path units 14 of roller-track conveyors 14, having in each case dissimilar track gauges in which the respective longitudinal profiled section 26 is equipped with the guide consoles 48 and a drive module 70, and the respective longitudinal profiled section 28 is equipped with the bearing consoles 60, are shown.

As can be seen therein, the individual construction and conveyor modules in the form of the longitudinal profiled sections 26, 28 and of the support frame 30, and the conveyor modules in the form of the guide consoles 48, of the bearing consoles 60, and of the drive module 70 having the drive fastening installation 82 and the rapid-changeover units 134, may be set up alongside one another in a space-saving manner. It is to be understood that all conveyor modules may also be stored separately from the respective longitudinal profiled section 26 or 28, such that the conveyor device 12 is completely disassembled into the construction and conveyor modules thereof.

Dissimilar track gauges of the roller-track conveyor 14 may be implemented in the case of support frames 30 of dissimilar widths. In the case of the variants shown in FIGS. 6A and 6B, shorter support frames 30a and longer support frames 30b are available. In the case of a plurality of through bores 44, available in various track-gauge spacings, in the connection profiles 34 of the support frame 30, the longitudinal profiled sections 26, 28 may be fastened to the support frames 30 at dissimilar spacings, that is to say track gauges.

Figure 7:
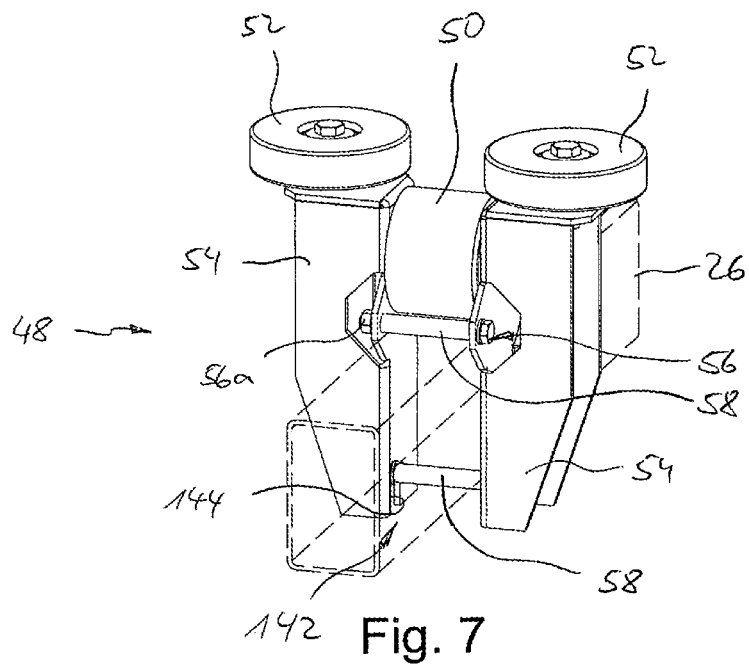
FIGS. 7 and 8 show modifications of the guide console as per FIG. 4, in order to illustrate various fastening concepts.
Figure 8:
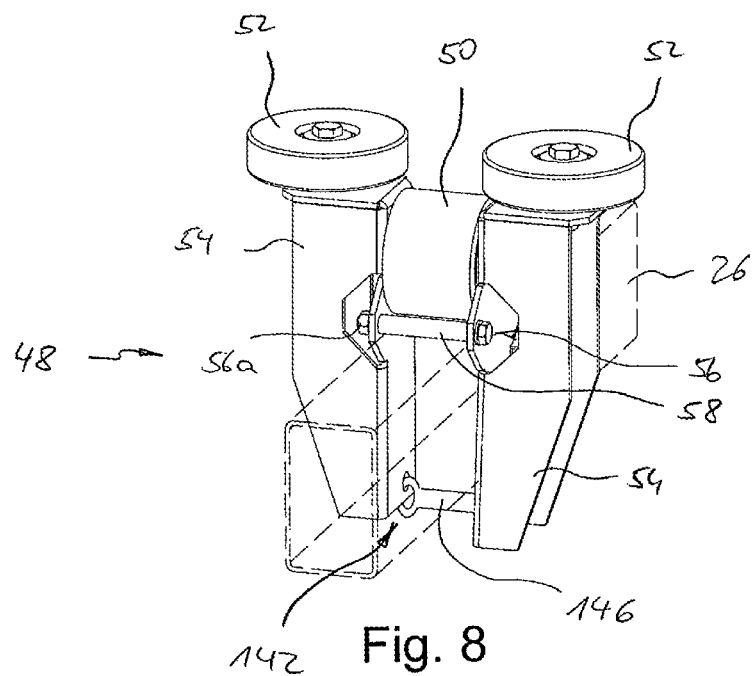

FIGS. 7 and 8 each additionally show one modified guide console in which in each case one quick-release fastener 142 is configured for the lower connection screw 56 having the locknut 56a and optionally having the spacer sleeve 58.

In the case of the guide console 48 shown in FIG. 7, the two clamping jaws 54 each have one receptacle slot 144, open to the bottom, such that the associated connection screw 56, having the locknut 56a already screwed thereonto and optionally also having the spacer sleeve 58, may be introduced from below into these two receptacle slots 144, whereupon the locknut 56a is then tightened and the two clamping jaws 54 are fastened to the longitudinal profiled section 26. However, the spacer sleeve 58 may also be dispensed with here; the adequate mutual spacing of the clamping jaws 54 is ensured by the pre-fitted upper spacer sleeves 58 which are already available.

In the case of this exemplary embodiment, additional guide consoles 48 may be rapidly fitted on demand, for example if and when shorter transportation skids 18 in which the previous spacings between two adjacent guide consoles 48 are too small have to be conveyed. The guide consoles 48 may then be placed from above, without the lower connection screw 56, onto the longitudinal profiled section 26 at the desired location of the longitudinal profiled section 26, and then be fastened in the manner described.

In principle, this is also possible in the case of a guide console 48 as per FIG. 4. In that case, the lower spacer sleeve 58 has to be initially positioned between the clamping jaws 54, and the connection screw 56 then has to be guided through the respective passage opening in the clamping jaw 54 and through the spacer sleeve 58, in order then to be able to screw on the locknut 56a and to fasten the system. In an analogous manner, this is also possible in this way in the case of the bearing consoles 60.

In the case of the guide console 48 shown in FIG. 8, only one clamping jaw 54 has a receptacle slot that is open toward the bottom; in FIG. 8, this is the right clamping jaw 54 in which the receptacle slot 142 is not visible, however. The other clamping jaw 54, to the left in FIG. 8, carries a pivotably mounted connection screw 146 at the bottom. The latter may be pivoted in the direction of the clamping jaw 54 such that the free end of said connection screw 146 is guided into the receptacle slot. Therein, a locknut which again is not visible in FIG. 8 may be screwed onto the pivotable connection screw 146, whereupon this locknut is then tightened and the two clamping jaws 54 are fastened to the longitudinal profiled section 26. By way of the connection screw 146 that is conjointly carried by the clamping jaw 54, the risk of this relatively small component being lost during transportation, storage, or else during fitting of the console unit 48 is reduced.

The quick-release fastener fastening concepts shown in FIGS. 7 and 8 may be realized in the same manner as is the case with the bearing consoles 60. These quick-release fastener fastening concepts are also possible in the case of the support frames 30; in particular, a pivotable clamping screw may be provided instead of the respective outward clamping screw 42.

Moreover, the quick-release fastener fastening concept explained may also be implemented in the case of the drive fastening installation 82. To this end, the available connection bolts 92 may be pivotably mounted on the drive-clamping jaw 84, for example, and the counter clamping jaw 86, at a location complementary thereto, may have slot-type receptacles into which the now pivotable connection bolts 92 may be pivoted.

In the case of all quick-release fastener fastening concepts, the direction of the pivoting movement is not firmly established, but rather may be provided in a horizontal or vertical direction, or else in a direction running at an angle thereto, as long as the slot-type receptacles on the respective mating component are accessible in a corresponding manner.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

What is claimed is:

1. A conveyor device for conveying transportation structures comprising:
    a) a conveyor path that is formed from a plurality of sequentially disposed path units, each of said path units comprising two mutually parallel longitudinal profiled sections;
    b) a drive system for the transportation structures, having at least one drive installation which is disposed on at least one of the longitudinal profiled sections during operation of the conveyor device;
    wherein
    c) the drive system comprises at least one drive module which is releasably fastenable to the longitudinal profiled section by means of a drive fastening installation,
    wherein each path unit comprises
        a plurality of guide consoles which are releasably fastenable to a longitudinal profiled section and which each mount one bearing roller for the transportation structure, and at least one guide roller for the lateral guidance of the transportation structure;
        and/or
        a plurality of bearing consoles which are releasably fastenable to a longitudinal profiled section and which each mount one bearing roller for the transportation structure, and
        a guide console comprises two clamping jaws, of which in each case one clamping jaw mounts one guide roller, and the bearing roller is mounted between the clamping jaws, wherein the clamping jaws therebetween may receive the longitudinal profiled section and are interconnectable by way of connection elements such that the guide console is clampable to the longitudinal profiled section;
        and/or
        a bearing console comprises two clamping jaws which therebetween mount a bearing roller, wherein the clamping jaws therebetween may receive the longitudinal profiled section and are interconnectable by way of connection elements such that the bearing console is clampable to the longitudinal profiled section.

2. The conveyor device as claimed in claim 1, wherein the at least one drive module comprises a drive unit which has a motor and a drive wheel, drivable by said motor, and which is releasably attachable and fixable to the drive fastening installation.

3. The conveyor device as claimed in claim 2, wherein the at least one drive installation operates as a friction-wheel drive and comprises a counter roller which interacts with the drive wheel.

4. The conveyor device as claimed in claim 2, wherein one of the clamping jaw or the counter clamping jaw of the drive fastening installation is a drive clamping jaw and is a first part of a pivoting hinge which comprises an additional pivoting jaw as a second part which is pressed toward the first part of the pivoting hinge by means of a pre-tensioning unit.

5. The conveyor device as claimed in claim 4, wherein the additional pivoting jaw has one or a plurality of receptacles for one or a plurality of retaining units on the drive unit.

6. The conveyor device as claimed in claim 5, wherein at least one retaining unit is configured as a mushroom pin, and one receptacle that is conceived for this retaining unit is configured as a slot-type receptacle or a key-hole receptacle.

7. The conveyor device as claimed in claim 1, wherein the drive fastening installation comprises a clamping jaw and a counter clamping jaw, which in the fitted state bear on mutually opposite external faces of the longitudinal profiled section and are clampable in relation to these external faces.

8. The conveyor device as claimed in claim 7, wherein the clamping jaw and the counter clamping jaw are connectable by means of connection bolts that are supported by the clamping jaw and are disposed such that at least one connection bolt extends transversely across an upper side, and at least one connection bolt extends transversely across a lower side of the longitudinal profiled section, if and when the drive fastening installation is attached to the longitudinal profiled section.

9. The conveyor device as claimed in claim 8, wherein the counter clamping jaw has passage openings which are complementary to the connection bolts and which are capable of being penetrated by the connection bolts that for fixing the drive fastening installation by means of securing means are fastenable to the counter clamping jaw.

10. The conveyor device as claimed in claim 1, wherein a quick-release fastener is configured for at least one available connection element from the connection elements.

11. The conveyor device as claimed in claim 1, wherein support frames which are releasably connectable to the longitudinal profiled sections are available.

12. A conveyor device for conveying transportation structures comprising:
  a) a conveyor path that is formed from a plurality of sequentially disposed path units, each of said path units comprising two mutually parallel longitudinal profiled sections;
  b) a drive system for the transportation structures, having at least one drive installation which is disposed on at least one of the longitudinal profiled sections during operation of the conveyor device;
  wherein
  c) the drive system comprises at least one drive module which is releasably fastenable to the longitudinal profiled section by means of a drive fastening installation, further wherein support frames which are releasably connectable to the longitudinal profiled sections are available.

13. The conveyor device as claimed in claim 12, wherein the at least one drive module comprises a drive unit which has a motor and a drive wheel, drivable by said motor, and which is releasably attachable and fixable to the drive fastening installation.

14. The conveyor device as claimed in claim 13, wherein the at least one drive installation operates as a friction-wheel drive and comprises a counter roller which interacts with the drive wheel.

15. The conveyor device as claimed in claim 13, wherein one of the clamping jaw or the counter clamping jaw of the drive fastening installation is a drive clamping jaw and is a first part of a pivoting hinge which comprises an additional pivoting jaw as a second part which is pressed toward the first part of the pivoting hinge by means of a pre-tensioning unit.

16. The conveyor device as claimed in claim 15, wherein the additional pivoting jaw has one or a plurality of receptacles for one or a plurality of retaining units on the drive unit.

17. The conveyor device as claimed in claim 16, wherein at least one retaining unit is configured as a mushroom pin, and one receptacle that is conceived for this retaining unit is configured as a slot-type receptacle or a key-hole receptacle.

18. The conveyor device as claimed in claim 12, wherein the drive fastening installation comprises a clamping jaw and a counter clamping jaw, which in the fitted state bear on mutually opposite external faces of the longitudinal profiled section and are clampable in relation to these external faces.

19. The conveyor device as claimed in claim 18, wherein the clamping jaw and the counter clamping jaw are connectable by means of connection bolts that are supported by the clamping jaw and are disposed such that at least one connection bolt extends transversely across an upper side, and at least one connection bolt extends transversely across a lower side of the longitudinal profiled section, if and when the drive fastening installation is attached to the longitudinal profiled section.

20. The conveyor device as claimed in claim 19, wherein the counter clamping jaw has passage openings which are complementary to the connection bolts and which are capable of being penetrated by the connection bolts that for fixing the drive fastening installation by means of securing means are fastenable to the counter clamping jaw.

21. The conveyor device as claimed in claim 12, wherein each path unit comprises
  a) a plurality of guide consoles which are releasably fastenable to a longitudinal profiled section and which each mount one bearing roller for the transportation structure, and at least one guide roller for the lateral guidance of the transportation structure;
  and/or
  b) a plurality of bearing consoles which are releasably fastenable to a longitudinal profiled section and which each mount one bearing roller for the transportation structure.

22. The conveyor device as claimed in claim 21, wherein a quick-release fastener is configured for at least one available connection element used to connect the clamping jaws of a bearing console.

* * * * *